United States Patent
Eberlein

(10) Patent No.: US 11,440,573 B2
(45) Date of Patent: Sep. 13, 2022

(54) MANUALLY MOVABLE TROLLEY

(71) Applicant: Martin Eberlein, Sofia (BG)

(72) Inventor: Martin Eberlein, Sofia (BG)

(*) Notice: Subject to any disclaimer, the term of this patent is extended or adjusted under 35 U.S.C. 154(b) by 39 days.

(21) Appl. No.: 16/965,277

(22) PCT Filed: Jan. 23, 2019

(86) PCT No.: PCT/DE2019/000015
§ 371 (c)(1),
(2) Date: Jul. 27, 2020

(87) PCT Pub. No.: WO2019/154449
PCT Pub. Date: Aug. 15, 2019

(65) Prior Publication Data
US 2021/0070341 A1    Mar. 11, 2021

(30) Foreign Application Priority Data

Feb. 7, 2018  (DE) .................. 20 2018 000 613.0
Feb. 9, 2018  (DE) .................. 20 2018 000 661.0

(51) Int. Cl.
*B62B 3/14*   (2006.01)
*B62B 5/00*   (2006.01)
(Continued)

(52) U.S. Cl.
CPC .................. *B62B 3/14* (2013.01); *B62B 5/00* (2013.01); *G01G 19/08* (2013.01); *H02J 50/10* (2016.02)

(58) Field of Classification Search
CPC ... B62B 3/14; B62B 5/00; G01G 19/08; H02J 50/10
See application file for complete search history.

(56) References Cited

U.S. PATENT DOCUMENTS 2,644,695 A * 7/1953 Enders .................. B62B 3/14
                                                        280/33.996
2,738,201 A   3/1956 Spears
(Continued)

FOREIGN PATENT DOCUMENTS

DE    8214932 U1    7/1982
DE    8714522 U1    5/1988
(Continued)

OTHER PUBLICATIONS

Canadian Office Action regarding Application No. 3,091,520 dated Sep. 20, 2021.

*Primary Examiner* — Emma K Frick
*Assistant Examiner* — Michael T. Walsh
(74) *Attorney, Agent, or Firm* — Harness, Dickey & Pierce, P.L.C.

(57) ABSTRACT

The invention relates to a manually movable and stackable trolley having a supporting device, wherein, when two trolleys are stacked, a rear region which is only taken up by the rear trolley and a front region which is only taken up by the trolley in front are produced, wherein the supporting device is assigned an electronic weighing device which is equipped with a first and a second weighing cell. The two weighing cells are arranged such that, in the stacked state, the first weighing cell of the rear, inserted trolley is within the rear region, and the second weighing cell of the inserted trolley is outside the front region, and, conversely, the first weighing cell of the trolley in front is outside the rear region, and the second weighing cell of the trolley in front is within the front region, wherein the first weighing cell is directed downwards from the at least one supporting device and the second weighing cell is directed upwards.

8 Claims, 3 Drawing Sheets

Figure 1:
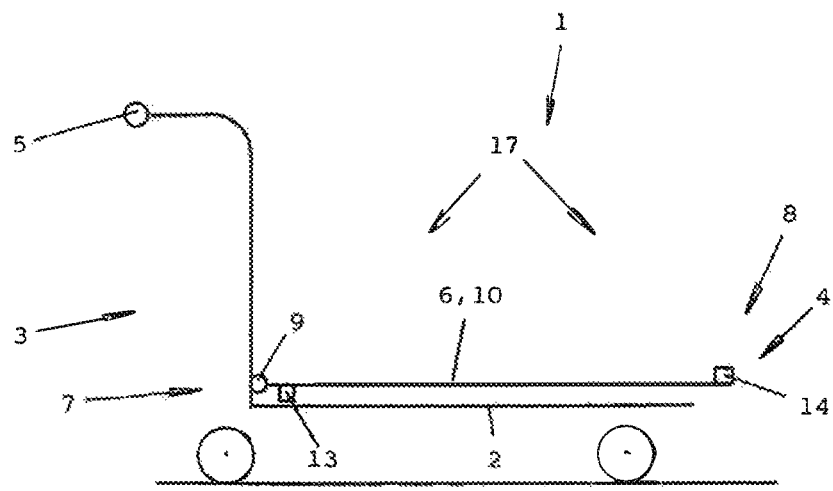

(51) Int. Cl.
  *G01G 19/08* (2006.01)
  *H02J 50/10* (2016.01)

(56) References Cited

U.S. PATENT DOCUMENTS

| | | | |
|---|---|---|---|
| 2,906,542 A * | 9/1959 | Hoedinghaus | B62B 3/14 |
| | | | 280/33.995 |
| 2,992,010 A | 7/1961 | Sides | |
| 3,197,224 A | 7/1965 | Kappen | |
| 3,789,957 A * | 2/1974 | Close | A47F 9/04 |
| | | | 186/63 |
| 3,813,111 A | 5/1974 | Ruger | |
| 4,373,611 A * | 2/1983 | Frederick | A47F 9/045 |
| | | | 186/64 |
| 9,120,497 B2 | 9/2015 | Eberlein | |
| 9,550,509 B2 | 1/2017 | Eberlein | |
| 2002/0140188 A1 | 10/2002 | O'Quin | |
| 2003/0205875 A1 | 11/2003 | Ondrasik et al. | |
| 2008/0211200 A1 | 9/2008 | Eberlein | |
| 2008/0231228 A1 * | 9/2008 | Fowler | H02J 7/0027 |
| | | | 320/107 |
| 2013/0069326 A1 | 3/2013 | Padgett et al. | |
| 2013/0207362 A1 * | 8/2013 | Smith | B62B 3/14 |
| | | | 280/47.34 |
| 2013/0334780 A1 | 12/2013 | Eberlein | |

FOREIGN PATENT DOCUMENTS

| | | | | |
|---|---|---|---|---|
| DE | 19643122 A1 | | 4/1998 | |
| DE | 202006019867 U1 | | 6/2007 | |
| DE | 202011003780 U1 | | 1/2012 | |
| EP | 1095839 A1 * | | 5/2001 | B62B 3/1468 |
| EP | 1775193 A2 | | 4/2007 | |
| EP | 2284062 A2 | | 2/2011 | |
| FR | 2610256 A2 * | | 8/1988 | B62B 5/0026 |
| GB | 2522291 A * | | 7/2015 | |
| KR | 20150065082 A * | | 6/2015 | |
| WO | WO-2014127757 A1 | | 8/2014 | |
| WO | WO-2016135142 A1 | | 9/2016 | |

\* cited by examiner

MANUALLY MOVABLE TROLLEY

CROSS-REFERENCE TO RELATED APPLICATIONS

This application is a 371 U.S. National Phase of International Application No. PCT/DE2019/000015, filed Jan. 23, 2019, which claims the benefit of German Patent Application No. 20 2018 000 613.0, filed Feb. 7, 2018 and German Patent Application No. 20 2018 000 661.0, filed Feb. 9, 2018. The entire disclosures of the above applications are incorporated herein by reference.

The invention relates to a manually movable transport trolley, which can be stacked with an identical transport trolley in the horizontal direction in a space-saving manner and which is equipped with a chassis, with a pushing device and with at least one deposit device intended for depositing or carrying objects, wherein, in the stacked state, a smallest possible distance is produced between two transport trolleys, which allows a rear region and a front region to be produced in the stacking connection of the two transport trolleys, wherein the rear region is only occupied by the rear inserted trolley and the front region is only occupied by the preceding trolley, wherein the at least one deposit device is assigned an electronic weighing device which is equipped with at least one first and with at least one second weighing cell, is operatively connected to the at least one deposit device and is intended for determining the weight of the objects carried by the at least one deposit device.

Document DE 196 43 122 A1 describes a mobile shopping trolley which, among other things, has an electronic scale, the loading surface of the shopping trolley forming the support surface for the scale. The scale is used to measure the total weight of the goods purchased. The scale is plate-shaped and is attached directly to the bottom of the loading area of the shopping trolley basket.

The document WO 2016/135142 deals with a system for the identification of products that are in a shopping cart, whereby this shopping cart is also equipped with a scale that is intended for the identification of the products. Such shopping trolleys are now in use in an Edeka market.

The shopping trolleys described in both documents have in common that their deposit devices have a relatively thick bottom. This thickness is due to the fact that the volume of the scale is either directly connected to the bottom of the deposit device or, if modern load cells are used, they are incorporated into the bottom of the deposit device. Thick bottoms on stackable transport trolleys mean that the stacking distances of transport trolleys stacked in a row are very large. The latter is a disadvantage, because unused trolleys to be provided in the stores take up a large amount of space.

In the case of the shopping trolley shown as FIG. 1 in document DE 196 43 122 A1, it can be assumed that the bottom of the basket is horizontal, so that such a shopping trolley can either not be stacked at all or only to a completely insufficient extent with another shopping trolley.

In the case of the transport trolleys used by Edeka, such a presumption is not necessary. The construction of the transport trolleys used there is such that they cannot be stacked with the same trolleys in a space-saving manner.

It is the object of the invention to modify a transport trolley of the type mentioned above in such a way that it can be stacked horizontally with the same transport trolleys in a space-saving yet very tight manner, as is possible with known stackable transport trolleys or also with standard shopping trolleys.

The achievement of the objective lies in that at least the at least one first and the at least one second load cell are arranged on the at least one deposit device in such a way that, when two identical transport trolleys are in the stacked state, the at least one first load cell of the rear pushed-in trolley is located inside the rear region and the at least one second load cell of the pushed-in trolley is located outside the front region, and that conversely the at least one first load cell of the preceding trolley is located outside the rear region and the at least one second load cell of the preceding trolley is located inside the front region, wherein the at least one first load cell is directed downwards from the at least one deposit device and the at least one second load cell is directed upwards from the at least one deposit device.

Since, when two trolleys are stacked, their load cells are located within the rear and front sections and these sections are not mutually used by the two trolleys, the load cells can be extended as far as necessary, either upwards or downwards. This also means that other parts belonging to the weighing equipment may also be located in both these areas, provided this is structurally possible. If the transport trolleys are as usual equipped with a floor for depositing the objects, this floor can be designed extremely thin, as is known from the state of the art, so that such transport trolleys, as well as previously commercially available transport trolleys, can be stacked extremely tightly, which is a very great advantage. When stacking two identical transport trolleys, the load cells do not interfere with each other. The same applies if the components intended to supply power to the weighing system are also located in the rear area and preferably on the loading platform. In this case, the loading platform together with the weighing system and all other necessary parts can be manufactured as a single unit without cables being visible from the outside.

Figure 2:
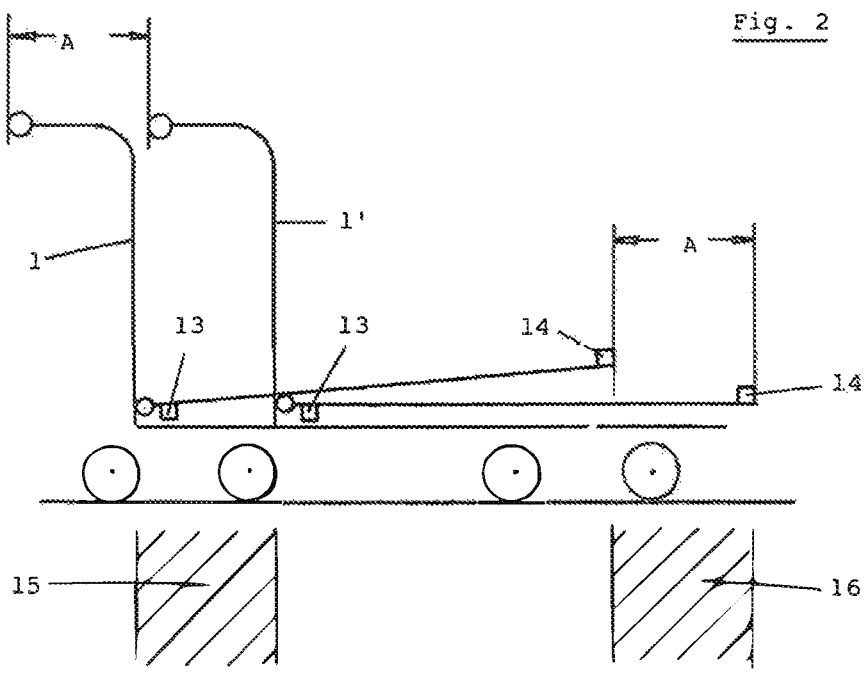
Figure 3:
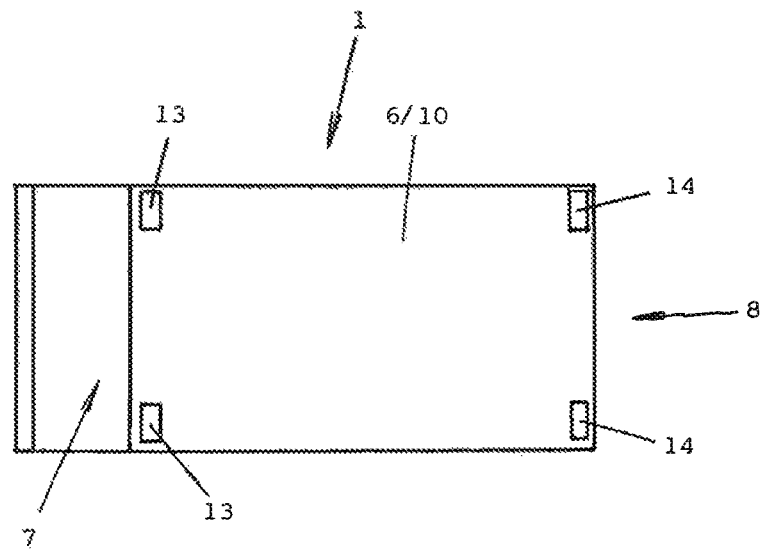
Figure 4:
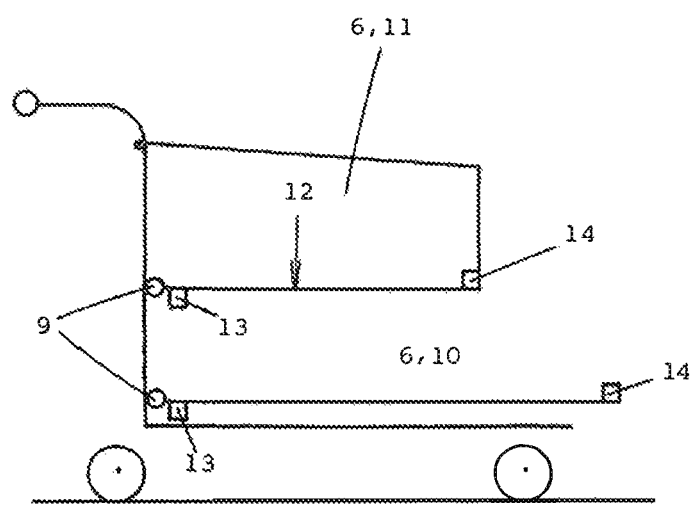
Figure 5:
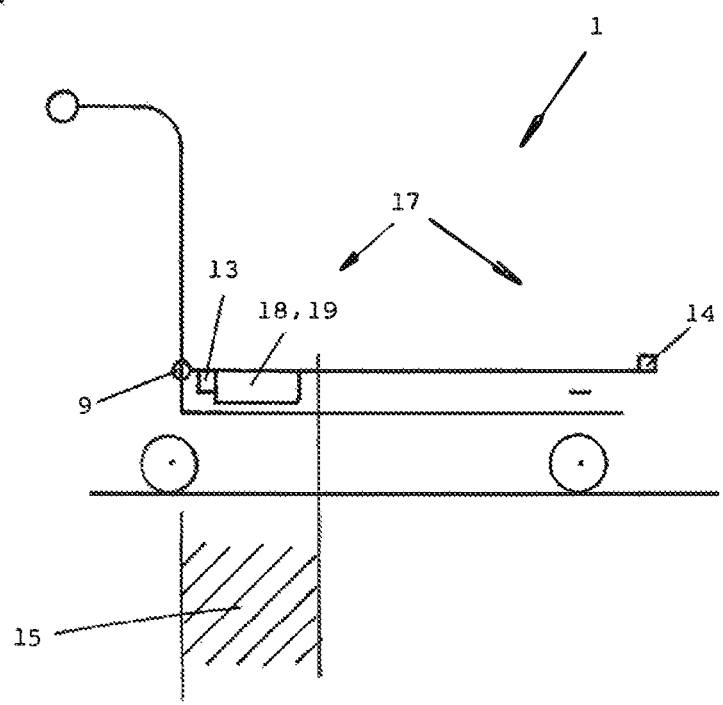

The invention is explained in more detail by means of schematically drawn exemplary embodiments. It shows FIG. 1 a manually movable transport trolley shown in side view;

FIG. 2 two space-saving transport trolleys pushed into one another;

FIG. 3 the transport trolley described in FIG. 1;

FIG. 4 a transport trolley, on which the at least one deposit device is in the form of a container and FIG. 5 also shows a further developed transport trolley in side view.

FIG. 1 shows in side view a manually movable transport trolley 1 which can be stacked in horizontal direction with an identical transport trolley 1' in a space saving way, see also FIG. 2. The transport trolley 1 has a chassis 2 as well as a pushing device 5 arranged at the rear. The chassis 2 carries a deposit device 6, which is designed as loading platform 10 in the example and on which objects can be placed. The deposit device 6 can be swivelled upwards and back again about a horizontal axis 9 located at the rear 3 of chassis 2. At the front 4 of chassis 2, the deposit device 6 is supported on chassis 2. This design is just as familiar as the design of chassis 2, which usually has a conical shape that enables the familiar stacking of such transport trolleys 1. At the rear end 7 of the deposit device 6 and close to the horizontal axis 9, at least one first load cell 13 is arranged on the deposit device 6, which can extend downwards. At the front end 8 of the deposit device 6 at least one second load cell 14 is provided which can extend upwards. In relation to a loading platform 10, this means that the at least one first load cell 13 can extend further downwards beyond the thickness of the loading platform 10 and the at least one second load cell 14 can extend upwards beyond the thickness of the loading platform 10. The load cells 13, 14 proposed here are state of the art and are offered, for example, by the German company Flintec.

This range includes compression, tension, planar beam or single point load cells, which can be used optionally for the purposes of this invention. The load cells 13, 14, also known as "weight sensors", belong to at least one electronic weighing device 17 which, connected to the at least one deposit device 6, is in operative connection with the deposit device 6 and which is intended to determine the weight of the objects carried by the deposit device 6. Each deposit device 6 is assigned its own weighing device 17.

FIG. 2 also shows in side view two transport trolleys 1, 1' of the same design pushed into each other i.e. stacked in a space saving manner, see also FIG. 1. In the drawing the inserted transport trolley 1 is shown on the left. The preceding transport trolley 1' is on the right hand side of the drawing. Both transport trolleys 1, 1' are pushed into each other as far as possible, which can be seen from the dimensions A. In this arrangement, a rear area 15 and a front area 16 are thus formed in hatched drawing. As is well known, the rear area 15 is only occupied by the pushed-in transport trolley 1 and the front area 16 only by the transport trolley 1' in front. It can be seen from the drawing that the at least one first and the at least one second load cell 13, 14 are arranged on the deposit device 6 of the two transport trolleys 1, 1' in such a way that the at least one first load cell 13 of the rear inserted transport trolley 1 is located inside the rear area 15 and the at least one second load cell 14 of the inserted transport trolley 1' is located outside the front area 16. Conversely, this means that the at least one first load cell 13 of the preceding trolley 1' is outside the rear area 15 and the at least one second load cell 14 of the preceding trolley 1' is inside the front area 16. In professional circles, the rear area 15 and the front area 16 are each also referred to as "stacking dead space".

In addition to the load cells 13, 14, other components belonging to the weighing device 17 can also be attached to the transport carriage in such a way that they are also located in the rear and/or front area 15, 16 when two transport carriages 1, 1' are stacked.

Transport trolleys 1 are usually equipped with swivel castors at the rear and/or front. Transport devices 1 are known to have only one swivel castor at the front, for example as a luggage trolley, and transport devices 1 are known to have two castors at the front. According to an advantageous design, transport trolley 1 is equipped with swivel castors at the rear and/or front and the rear area 15 and the front area 16 in the pushing direction of transport trolley 1 are each shorter than the diameter of the interference circle of the swivel castors and/or shorter than one and a half times the diameter of the circles described by the running surfaces of the swivel castors. The diameter of the interference circle is equal to twice the swivel radius of a swivel roller. If the load cells 13, 14 are arranged in such short rear areas 15 and front areas 16, the equipment of a transport device 1 with a weighing device 17 does not adversely affect the size of known optimised stack spacings.

FIG. 3 shows the transport trolley 1 described in FIG. 1 in top view. On the deposit device 6, designed as loading platform 10, two first load cells 13 are arranged at the rear end 7 and two second load cells 14 at the front end 8 in a geometrically regular form. When viewed from above, the load cells 13, 14 form a rectangle. If only one first and one second load cell 13, 14 are required, it is suggested that they be arranged either on the central longitudinal axis of the transport trolley 1 or on the corresponding transverse axis.

More than four load cells 13, 14 can also be provided. In all design examples the first load cells 13 may be located at a distance from the rear end 7 of the at least one deposit device 6 and the second load cells 14 may be located at a distance from the front end 8 of the at least one deposit device 6.

According to an advantageous design, the greatest horizontal extent of the at least one first load cell 13 and/or the at least one second load cell 14 is greater than the stacking distance between two transport trolleys and the direction of the maximum horizontal extension of the load cells 13, 14 is at an angle to the pushing direction of the transport trolley. In the illustration in FIG. 3, the direction of the largest horizontal expansion of the load cell is at right angles to the pushing direction of the transport trolley 1. The stacking distance between two transport trolleys extending in the pushing direction is shown in FIG. 2 as distance "A".

FIG. 4 shows that the deposit device 6 of a transport trolley 1 can also be designed in the form of a container 11, similar to the shape of a conventional shopping trolley. The base 12 of the thus designed deposit device 6 basically forms a loading platform 10, which is bordered by side walls. The at least one first load cell 13 and the at least one second load cell 14 are again arranged as described above. A second deposit device 6 with the corresponding load cells 13, 14 can also be provided below the deposit device 6 arranged above. In order to enable the space-saving stacking of identical transport trolleys 1, the base 12 of the deposit device 6 can be designed so that it can be swivelled upwards about a horizontal axis 9, as is the case with a loading platform 10. The same also applies if the complete deposit device 6, designed as a container 11, is arranged on the chassis 2 so that it can be swivelled upwards and back again about a horizontal axis 9 and within a swivel range likewise determined by stops. In both cases, the rear wall of container 11 shall also be designed to swivel in a known manner. Such designs of a deposit device 6 designed as a container 11 allow the base 12 of such a deposit device 6 to be kept in a horizontal position of use, since, in general, a horizontal arrangement of the base 12 or a loading platform 10 considerably facilitates the weighing process in terms of exact weight determination. This statement applies to all design examples described here.

In addition to the load cells 13, 14, other components belonging to the weighing device 17 or enabling or supporting the function of the weighing device 17 can also be attached to the transport trolley 1 in such a way that they are at least in the rear area 15 when two transport trolleys 1, 1' are stacked.

FIG. 5 therefore shows a transport trolley 1 in which, for example, the battery array 18 intended for the power supply of the weighing device 17 is located in the rear area 15 of the transport trolley 1. If energy is transmitted to the transport trolley 1 by inductive means, it is suggested that the at least one receiving coil 19 located on the transport trolley 1 is also arranged in the rear area 15. The same applies to other possible electronic control components and the like. In this case, it is advantageous if all the components or functional parts just described are attached to the loading platform 10 within the rear area 15 and also use the space available at the bottom. Since the battery array 18 in particular has a non-negligible weight, it makes sense to position the battery array 18 very close to the horizontal axis 9 so that the weight of the battery array 18 does not make it particularly difficult to stack the transport trolleys 1, 1', 1". The same applies to all other parts mentioned above, which are shown as a package in the drawing.

The invention leaves the skilled person free to design the deposit device 6.

For example, a frame unit or carrying unit may be mounted so as to pivot about a horizontal axis 9 located at the rear 3 of the chassis 2. The load cells 13, 14 are attached to the frame unit and the load platform 10 is attached to the load cells, which in turn serve as a storage device 6. It is also possible to design a deposit device 6 in such a way that it can be used, for example, for hanging, i.e. for carrying bags intended for receiving objects. It is generally recommended to use the described transport trolleys 1 in self-service stores. Since a large number of transport trolleys 1 must be available to customers in such markets and since this large number of transport or shopping trolleys must also be provided in a space-saving manner, the transport trolleys 1 proposed here are ideally suited to meet this requirement.

The invention claimed is:

1. A manually movable transport trolley, that is configured to be stacked with an identical manually movable transport trolley in a horizontal direction in a space-saving manner, the manually movable transport trolley being is equipped with a chassis, a pushing device, and at least one deposit device configured for depositing or carrying objects, the at least one deposit device including an electronic weighing device that is equipped with at least one first weighing cell and with at least one second weighing cell that are each operatively connected to the at least one deposit device and are each configured for determining a weight of the objects that are deposited or carried by the at least one deposit device, wherein the manually movable transport trolley is configured such that, in the stacked state between the manually movable transport trolley and the identical manually movable transport trolley, the manually movable transport trolley is mated with the identical manually movable transport trolley such that a rear region and a front region are produced in the stacked state of the manually movable transport trolley and the identical manually movable transport trolley, wherein, in the stacked state, the rear region is only occupied by the manually movable transport trolley that is inserted into a rear of the identical manually movable transport trolley and the front region is only occupied by the identical manually movable transport trolley, wherein at least the at least one first weighing cell and the at least one second weighing cell are arranged on the at least one deposit device in such a way that, when the manually movable transport trolley and the identical manually movable transport trolley are in the stacked state, the at least one first weighing cell of the manually movable transport trolley is located inside the rear region and the at least one second weighing cell of the manually movable transport trolley is located outside the front region, and that conversely the at least one first weighing cell of the identical manually movable transport trolley is located outside the rear region and the at least one second weighing cell of the identical manually movable transport trolley is located inside the front region, and wherein the at least one first weighing cell of the manually movable transport trolley is directed downwards from the at least one deposit device and the at least one second weighing cell is directed upwards from the at least one deposit device.

2. The manually movable transport trolley according to claim 1, wherein there are two first weighing cells and two second weighing cells that, plan view, are arranged at corners of the at least one deposit device.

3. The manually movable transport trolley according to claim 1, wherein there is at least one of two first weighing cells and two second weighing cells that are horizontally separated from each other, and a horizontal distance between the two first weighing cells and the second weighing cells is greater than a stacking distance between the manually movable transport trolley and the identical manually movable transport trolley, and that directions at which the horizontal distances extend are each at an angle to a pushing direction of the transport trolley.

4. The manually movable transport trolley according to claim 1, wherein the manually movable transport trolley is equipped with swivel castors at a front and rear thereof, and that the rear region and the front region in the pushing direction of the manually movable transport trolley are each at least one of being shorter than an interference circle of the swivel castors and shorter than one and a half times a diameter of circles defined by the running surfaces of each of the swivel castors.

5. The manually movable transport trolley according to claim 1, wherein the at least one first weighing cell is arranged at a distance from a rear end of the at least one deposit device and the at least one second weighing cell is arranged at a distance from a front end of the at least one deposit device.

6. The manually movable transport trolley according to claim 1, wherein the at least one deposit device is configured as a container, and either its base or an entirety of the at least one deposit device are configured to swivel about a horizontal axis within a defined swivel range.

7. The manually movable transport trolley according to claim 1, wherein electronic weighing device, includes at least one of a battery array and at least one receiver coil that are configured to provide inductive energy transmission to the electronic weighing device.

8. The manually movable transport trolley according to claim 1, wherein components configured to supply power to the electric weighing device are arranged on a loading platform of the at least one deposit device and extend downwards therefrom.

* * * * *